| United States Patent [19] | [11] | 4,118,293 |
|---|---|---|
| Ruf et al. | [45] | Oct. 3, 1978 |

[54] PROCESS FOR PRODUCING TIN (II) SULFATE

[75] Inventors: Erich Ruf; Hans Loges, both of Essen, Germany

[73] Assignee: Th. Goldschmidt AG, Essen, Germany

[21] Appl. No.: 759,396

[22] Filed: Jan. 14, 1977

[30] Foreign Application Priority Data

Jan. 21, 1976 [DE] Fed. Rep. of Germany ....... 2602031

[51] Int. Cl.$^2$ ................................................ C25B 1/00
[52] U.S. Cl. ...................................... 204/93; 204/295; 264/43; 264/66
[58] Field of Search .................................. 204/93, 295

[56] References Cited

U.S. PATENT DOCUMENTS

| 1,901,364 | 3/1933 | Cummings | 204/93 |
| 1,947,006 | 2/1934 | Heineken et al. | 204/93 |
| 2,673,837 | 3/1954 | Lowe et al. | 204/94 |
| 2,943,032 | 6/1960 | Benner | 204/295 |
| 3,102,085 | 8/1963 | Edwards et al. | 204/295 |
| 3,795,595 | 3/1974 | Wilson | 204/93 |

FOREIGN PATENT DOCUMENTS

| 37-1,885 | 5/1962 | Japan | 204/295 |
| 942,497 | 11/1963 | United Kingdom | 204/295 |
| 141,860 | 1/1961 | U.S.S.R. | 204/93 |

OTHER PUBLICATIONS

Lin et al., "J. Electrochem. Soc. Electrochemical Technology", vol. 118, No. 2, Feb. 1971, pp. 402–403.

*Primary Examiner*—T. Tung
*Attorney, Agent, or Firm*—Toren, McGeady and Stanger

[57] ABSTRACT

An electrolytic method for making tin (II) sulfate wherein tin is anodically dissolved in a sulfuric acid solution and wherein the anode space is separated from the cathode space by a diaphragm, the diaphragm being composed of an inorganic, ceramic material which has been densified by sintering at above 1,000° C.

As a result of this process, tin (II) sulfate solutions can be obtained which have a very low content of tin (IV) compounds and from which a highly pure bivalent tin sulfate can be recovered.

3 Claims, No Drawings

PROCESS FOR PRODUCING TIN (II) SULFATE

BACKGROUND OF THE INVENTION

1. Field of the Invention

This invention relates to a process for economically producing tin (II) sulfate having a low chloride and tin (IV) content.

2. Description of the Prior Art

Tin (II) sulfate is employed in the galvanizing industry today for tinning a variety of objects. However, it is especially used for tinning household articles, printed circuits, electrical articles and consumer articles, such as, screws, can openers and the like.

Also, for reasons of toxicity and because of legislation dealing with foodstuffs, cadmium plating and zinc plating are being increasingly replaced by galvanic tinning.

Galvanic tinnings are frequently conducted with the so-called "soluble anodes" wherein metallic tin, frequently in the form of a rod or plate, is electrolytically dissolved in dilute sulfuric acid. At the same time, the object to be tinned or the objects to be tinned are inserted directly into the circuit as the cathode and, by means of such an arrangement, the tin is deposited directly onto these objects.

Such galvanic tinning baths must initially be brought to the required operating concentration by the addition of tin (II) sulfate either in the form of a solution or as the solid salt. This adjustment of concentration is necessary because tin is dissolved and deposited at practically the same rate and it is therefore not possible to build up significant concentrations of tin (II) sulfate in the respective solutions.

However, losses occasioned by tin (II) sulfate solution adhering to the tinned objects as they are removed from the tinning bath, must again be replaced or compensated for by the occasional addition of tin (II) sulfate.

Tin (II) sulfate has also been employed very successfully in the metallic-salt dyeing of aluminum for some years.

Because of the quality of the finishing agent and the simplicity and economy of the galvanic or electrolytic process, it is necessary, in these fields of application, to use tin (II) sulfate that has a low chloride and a low tin (IV) content and which, in addition, is obtained in as economical a manner as possible.

According to the state of the art, tin (II) sulfate is obtained by reacting tin (II) chloride which is obtained by dissolving tin in hydrochloric acid, optionally with an excess of metallic tin, while simultaneously passing in chlorine or by reacting tin with tin (IV) chloride, with soda solution to form tin (II) oxide (tin suboxide) and reacting tin (II) oxide with dilute sulfuric acid. The tin (II) sulfate so formed is separated from the mother liquor.

Also, the electrolytic production of tin (II) sulfate by anodically dissolving tin in aqueous sulfuric acid is well known.

In so doing, processes are known which operate without the use of membranes and in which electrode polarity reversal is effected at certain time intervals as well as processes which operate with organic membranes or organic anion-exchange membranes.

An electrolytic process for producing tin (II) sulfate without the use of membranes is described in the publication, J. Electrochem. Soc. Electrochemical Technology, Feb. 1971, Vol. 118 and processes using organic membranes or organic anion-exchange membranes are described in the Russian Pat. Nos. 141,860 and 157,342 as well as in the U.S. Pat. No. 3,795,595. These processes, however, which represent the state of the art, have serious difficulties to some extent.

For instance, the wet chemical processes involve several operating steps which require the use of different chemicals, long processing time, and therefore are costly.

Electrolytic processes for producing tin (II) sulfate which operate without membranes are uneconomical because, although tin goes into solution anodically, it is deposited at the cathode at the same time. By reversing the polarity of the electrodes, the previously deposited tin can be brought into solution again. However, the process of direct tin deposition at the respective cathode is not eliminated by such a procedure.

The electrolytic processes for producing tin (II) sulfate with organic membranes are disadvantageous because organic membranes have a small pore volume relative to the external total volume of such membranes. In addition, the pore size is relatively large because of the process used to produce such membranes and because it is not possible to sinter such membranes at high temperatures and thus alter their density. As a consequence, these membranes are permeable to several different ions. Thus, in using membranes of this type, this fact, which is economically disadvantageous due to secondary reactions, must be considered.

Processes for producing tin (II) sulfate by electrolytic means involving the use of organic anion-exchange membranes which are permeable to anions have the disadvantage that essentially only anions pass through the membrane and therefore, the conductivity is determined by the mobility or the equivalent conductivity of such anions. Cations and, therefore, also hydrogen ions or hydrated hydrogen ions which are known to be present in aqueous solutions, cannot pass through such membranes.

SUMMARY OF THE INVENTION

It is therefore a primary object of the present invention to develop an especially economical process for producing tin (II) sulfate by means of which tin (II) sulfate is obtained which has a low chloride and tin (IV) content.

This is accomplished pursuant to the invention by using an electrolyte process wherein a diaphragm composed of ceramic materials is used which has been densified by sintering above 1000° C. Preferably, the diaphragms have wall thicknesses in excess of 5 mm, pore widths smaller than 2 $\mu$m and a pore volume that is greater than 45%.

Densely sintered diaphragm materials in accordance with the present invention are permeable practically only to hydrated hydrogen atoms because of the slight pore size or pore width for wall thicknesses in excess of 5 mm. Since, additionally, they have a very large pore volume, they exhibit slight electrical resistance while having high mechanical strength.

DESCRIPTION OF THE PREFERRED EMBODIMENT

The diaphragms for use in the inventive process may be obtained by well known procedures, for example, by grinding mixtures of kaolin, water and pure clay, casting the dross so obtained into plaster molds, drying the castings and subsequently firing them at ca. 1250° C.

For carrying out the process, electrodes of metallic tin are used as the anode as well as the cathode. These electrodes do not employ any foreign carrier materials. When a direct voltage was applied to the two tin electrodes using a dilute, aqueus sulfuric acid solution or a tin (II) sulfate solution, acidified with up to 250 g sulfuric acid per liter as the anolyte liquid and dilute or concentrated aqueous sulfuric acid as the catholyte liquid or as the electrolyte for the diaphragm space, almost saturated tin (II) sulfate solutions were obtained, corresponding to the respective residual sulfuric acid, at average voltages of less than 5 V.

In this process, using dilute, aqueous sulfuric acid solutions or tin (II) sulfate solutions, weakly acidified with sulfuric acid, almost 100% current yields, based on the tin sulfate produced, are achieved. In the process, hydrogen is evolved at the cathode beginning with the commencement of the reaction and the tin (II) sulfate solutions produced have a particularly low content of quadrivalent tin compounds.

In contrast to the inventive process, it is not possible by chemical means to dissolve tin in an economical manner in dilute sulfuric acid. As the appropriate experiments showed, even when sulfuric acid solutions containing up to 300 g/l $H_2SO_4$ and which, in each occasion, contained 20 g of granulated tin and 250 ml of sulfuric acid were boiled for 48 hours, only 1% of the amount of metallic tin introduced was dissolved. Under these conditions, however, one-third of the amount of tin dissolved was present in the quadravalent form.

On using sulfuric acid solutions containing 1000 g or more of sulfuric acid per liter, metallic tin dissolves more rapidly with increasing sulfuric acid concentration. However, the tin that has gone into solution is present exclusively in the quadrivalent form.

For those skilled in the art, it was moreover surprising that, when the special diaphragm is used in accordance with the present invention and when the saturation concentration of tin (II) sulfate is reached, the saturation concentration being dependent on the given concentration of sulfuric acid which determines the solubility of the tin (II) sulfate, there is an increase in voltage and, above all, an evolution of oxygen. Almost simultaneously or immediately before oxygen is evolved, the anode color initially turns black with the formation of a tin-containing coating. This coating, in time becomes white and at least partially falls off the anode. This formation of the tin-containing coating at the anode after the saturation concentration of tin (II) sulfate is reached in the respective electrolyte liquid evidently leads to a polarization of the anode so that there is an increase in the voltage and an evolution of oxygen at the anode.

On continuing the electrolysis after the respective saturation concentration of tin (II) sulfate is reached, a decrease in the concentration of bivalent tin in the solution commences.

The solubility of tin (II) sulfate in aqueous sulfuric acid decreases rapidly with increasing concentration of sulfuric acid. For example, for a sulfuric acid concentration of 500 g per liter at 20° C., the solubility of tin (II) sulfate is less than 15 g per liter. It is thus advantageous to use dilute sulfuric acid, preferably with less than 100 g sulfuric acid per liter of solution. By observing this condition, not only are relatively high tin (II) sulfate concentrations obtained, but also, by using lower concentrations of sulfuric acid, tin (II) sulfate may be prepared which is especially deficient in tin (IV).

If sulfuric acid is used at a concentration of 300 g per liter then, because of the very slight solubility of tin (II) sulfate in such concentrations of sulfuric acid, the formation of a coating at the anode, the evolution of oxygen and the clear increase in the voltage occur after a few minutes. Moreover, the formation of tin (IV) sulfate is favored.

In producing concentrated tin (II) sulfate solutions according to the inventive procedure, tin is deposited to a slight extent at the cathode and slight amounts of anode sludge are formed in the anode space.

The tin that is deposited to a slight extent at the cathode, does not normally adhere firmly so that it falls off from the cathode with only a small movement of the liquid. The adhesion of the tin deposited at the cathode can be improved if slight amounts of an alkoxylated nonylphenol are added in concentrations of about 5 to 100 ppm to the catholyte. As a result of such an addition, the cathodes can be readily moved in the liquids without having the deposited tin fall off, so that such cathodes can also be employed as anodes in subsequent electrolytic tin-dissolving processes.

After being separated from the anolyte, the anode sludge can be worked up into metallic tin or into tin compounds by known procedures.

Solid tin (II) sulfate can be extracted from the practically saturated tin (II) sulfate solutions obtained by first reacting, with stirring, the residual sulfuric acid with tin (II) oxide in amounts equivalent to or in slight excess of the free sulfuric acid, separating the almost insoluble tin (IV) compounds which are formed to a slight extent, e.g., by decanting or filtering, and then evaporating the solution to dryness with stirring and preferably, under vacuum at temperatures up to a maximum of 150° C.

In so doing, it was also surprising to those experienced in the art that, after neutralizing the free sulfuric acid in the tin (II) sulfate solutions with compatible material, solid, crystalline, free flowing tin (II) sulfate can be obtained by evaporating the thus pretreated, clear solutions to dryness, without a noticeable oxidation to quadrivalent tin compounds.

The inventive process is described in greater detail by the following examples.

EXAMPLE 1

(a) Production of a Concentrated Tin (II) Sulfate Solution

A rectangular PVC cell (length 780 mm, height 1025 mm, width 680 mm) is divided into three spaces by inserting two PVC partitions so that two outer spaces, each 170 mm × 780 mm × 1025 mm, and one inner space, 340 mm × 780 mm × 1025 mm, result.

Two inorganic diaphragm plates (prepared from mullite, a fire- and acid-resistant aluminum silicate of the formula 3 $Al_2O_3$ × 2 $SiO_2$), 350 mm × 500 mm, having a thickness of 8 mm, a pore width of ca. 1 $\mu$m and a pore volume of ca. 55%, are cemented into the partitions.

The two outer spaces (cathode spaces) are each filled with 112 liters of sulfuric acid solution, in each case containing 250 g of sulfuric acid per liter, as well as 30 mg of decaethyleneglycol-mono-nonylphenylether per liter. The inner space (anode space) is filled with 245 liters of sulfuric acid solution having a concentration of 70 g $H_2SO_4$ per liter.

In each of these spaces, a tin electrode with an immersion area of 640 mm × 1000 mm and a thickness of 12 mm, is mounted. The tin electrode in the inner space is mounted in the center of that space.

The respective distance from the center to the two outer electrodes is 320 mm. The tin electrode in the center is connected in the circuit so as to be the anode and and the two outer electrodes are connected so as to be the cathodes.

After a direct voltage is applied, the production of tin (II) sulfate solution by electrolytic means is carried out under the following operating conditions:

| | |
|---|---|
| anode surface area, active two sides: | 1.28 m$^2$ |
| cathode surface area, calculated one-sided in each case: | 2 × 0.64 m$^2$ |
| effective diaphragm surface area, calculated one-sided in each case: | 2 × 0.35 m$^2$ |
| duration of electrolysis: | 86.8 l hr |
| amperage: | 180 amp |
| current density, based in each case on a diaphragm surface, active on one side: | 257 amp/m$^2$ |
| voltage at beginning of electrolysis: | 2.5 V |
| voltage at end of electrolysis: | 4.7 V |
| average voltage: | 3.35 V |

In producing the tin (II) sulfate solution by electrolytic means, the solution heats up of its own accord during the electrolysis to ca. 40° to 50° C.

After the electrolysis is concluded, a solution of tin (II) sulfate, which is concentrated from a practical point of view and which has the following contents, is obtained.

| Anode Liquid after electrolysis is Concluded | |
|---|---|
| total amount: | 277.6 l |
| free sulfuric acid: | 11.2 g H$_2$SO$_4$/l |
| bivalent tin: | 144.8 g Sn/l |
| quadrivalent tin: | 1.6 g Sn/l |
| Cathode Liquid after Electrolysis is Completed | |
| total amount | 218.4 l |
| free sulfuric acid: | 222.0 g H$_2$SO$_4$/l |
| Yields and Quantities Consumed | |
| current yield, based on bivalent tin that has gone into solution: | 95 % |
| current consumption per kg of bivalent tin that has gone into solution: | 1.59 kwh |
| the amount of anode sludge formed during the electrolysis was: | 3.1 g/kg of bivalent tin that has gone into solution |
| the amount of tin deposited at the cathode during the electrolysis: | 7.5 g/kg of bivalent tin that has gone into solution |

(b) Recovery of Solid Tin (II) Sulfate 1 cubic meter of tin (II) sulfate solution obtained in a manner analogous to that under (a) and containing 131.4 g Sn(II) per liter, 2.2 g Sn(IV) per liter and 12.2 g free sulfuric acid per liter, was treated, with stirring, with 20 kg tin (II) oxide in a 2 cubic meter PVC vessel with stirring facilities. After the solution was stirred for 1 hour, it was allowed to stand for several hours for the purpose of permitting the almost insoluble tin (IV) compounds to deposit. After it clarified, the supernatant solution, namely, 995 l with 146 g Sn(II)/l, was evaporated under vacuum (ca. 600 mm Hg) and with stirring and heating in a 1.2 cubic meter enameled vessel equipped with a stirrer and a steam and cooling jacket. The water was removed at a temperature of ca. 56° C.

After evaporating for 6 hours, 263 kg of solid, dry, free-flowing tin (II) sulfate having the composition below were obtained:
54.6% bivalent tin
0.6% quadrivalent tin
0.1% free sulfuric acid

EXAMPLE 2

(a) Production of a Concentrated Tin (II) Sulfate Solution

A rectangular PVC cell (length 292 mm, height 295 mm, width 170 mm) is divided into three spaces by inserting two PVC partitions whose distance from one another is 22 mm and which each contains a diaphragm plate with the dimensions of 127 mm × 168 mm and a thickness of 8 mm, a pore width of ca. 1 μm and a pore volume of 55%. The small central space represents the so-called diaphragm space. 6 l of electrolyte solution with 220.5 g H$_2$SO$_4$/l, 0.2 g of bivalent tin per liter, 0.3 g of quadrivalent tin per liter, as well as 20 mg of decaethyleneglycol-mono-nonylphenylether per liter were added to one of the two outer spaces (cathode space) and 5.74 l of electrolyte solution with 96.1 g of H$_2$SO$_4$/l, 9.5 g of bivalent tin per liter and 0.9 g of quadrivalent tin per liter were added to the other outer space (anode space). 0.5 l of an aqueous solution of sulfuric acid with 207 g H$_2$SO$_4$/l were added to the diaphragm space. A tin electrode with an immersion area of 180 mm × 148 mm and a thickness of 5 mm was mounted in each of the two outer spaces.

The distance of the two electrodes from one another was 100 mm. The tin electrode in the anode space is connected in the circuit as the anode and the tin electrode in the cathode space as cathode.

After a direct voltage is applied, the production of tin (II) sulfate by electrolytic means is carried out under the following operating conditions:

| | | |
|---|---|---|
| anode surface, active on one side: | 0.027 | m$^2$ |
| cathode surface, active on one side: | 0.027 | m$^2$ |
| active diaphragm area (one diaphragm plate, calculated for only one side): | 0.022 | m$^2$ |
| duration of electrolysis: | 31.8 | hr |
| amperage: | 9.53 | amp |
| current density, based on a diaphragm surface, active one one side: | 433 | amp/m$^2$ |
| voltage at the beginning of the electrolysis: | 2.3 | V |
| voltage at the end of the electrolysis: | 3.4 | V |
| average voltage: | 2.92 | V |

During the electrolysis, the solution heats up to ca. 45° C.

After the electrolysis is concluded, a solution of tin (II) sulfate which is concentrated from a practical point of view and which has the following contents is obtained.

| Anode Liquid after Electrolysis is Concluded | |
|---|---|
| Total amount: | 5.8 l |
| free sulfuric acid: | 34.8 g H$_2$SO$_4$/l |
| bivalent tin: | 113.4 g Sn/l |
| quadrivalent tin: | 4.0 g Sn/l |
| Cathode Liquid after Electrolysis is Concluded | |
| total amount: | 5.8 l |
| free sulfuric acid: | 200.0 g H$_2$SO$_4$/l |
| bivalent tin: | 0.3 g Sn/l |
| quadrivalent tin: | 0.7 g Sn/l |
| Yields and Quantities Consumed | |
| Current yield, based on | |

| | |
|---|---|
| the bivalent tin that has gone into solution: | 92.9% |
| current consumption per kg of bivalent tin that has gone into solution: | 1.42 kwh |
| the amount of anode sludge formed during the electrolysis was: | 12.5 g Sn/kg of bivalent tin that has gone into solution |
| the amount of tin deposited at the electrode during the electrolysis: | 2.9 g Sn/kg of bivalent tin that has tone into solution |

(b) Recovery of Solid Tin (II) Sulfate 1 cubic meter of tin (II) sulfate solution obtained in a manner analogous to that under (a) and containing 121 g Sn(II) per liter, 2.0 g Sn(IV) per liter and 5.0 g free sulfuric acid per liter, was treated, with stirring, with 8 kg tin (II) oxide in a 2 cubic meter vessel with stirring facilities.

After the solution was stirred for 1 hour, it was allowed to stand for several hours for the purpose of permitting the almost insoluble tin (IV) compounds to deposit. After it has clarified, the supernatant solution, namely, 995 l with 127 g Sn(II)/l, was evaporated under vacuum (600 mm Hg), with stirring and heating in a 1.2 cubic meter enameled vessel equipped with a stirrer and a steam and cooling jacket. The water was removed at a temperature of ca. 56° C.

After 6 hours, 231.5 kg of dry, solid, free-flowing tin (II) sulfate, having the following composition were obtained:

53.7% bivalent tin
0.9% quadrivalent tin
0.4% free sulfuric acid.

What is claimed is:

1. In an electrolytic process for producing tin(II) sulfate by dissolving tin anodically in a sulfuric acid solution in which the anode space is separated from the cathode space by a diaphragm or by a space limited by diaphragms, the improvement which comprises said diaphragm being a sintered diaphragm composed of inorganic, ceramic materials which have been sintered at above 1000° C., said diaphragms having wall thicknesses in excess of 5 mm, pore widths smaller than 2 $\mu$m and a pore volume greater than 45%.

2. The process of claim 1 wherein the sulfuric acid concentration is less than 100 grams per liter of solution.

3. The process of claim 1 wherein the diaphragm is obtained by grinding a mixture of kaolin, water and pure clay, casting the thus obtained dross into a mold, drying the cast and then firing the casting at about 1250° C.

* * * * *